United States Patent
Castner

(10) Patent No.: US 6,617,406 B2
(45) Date of Patent: *Sep. 9, 2003

(54) SYNTHESIS OF ELASTOMERIC HIGH TRANS-1,4-POLYBUTADIENE

(75) Inventor: Kenneth Floyd Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/943,155

(22) Filed: Aug. 30, 2001

(65) Prior Publication Data

US 2003/0065114 A1 Apr. 3, 2003

(51) Int. Cl.[7] .......................... C08F 4/70; C08F 136/06
(52) U.S. Cl. ................ 526/142; 526/169.1; 526/335
(58) Field of Search ............................ 526/142, 169.1, 526/335

(56) References Cited

U.S. PATENT DOCUMENTS

| | | | |
|---|---|---|---|
| 4,225,690 A | 9/1980 | Halasa et al. | 526/183 |
| 5,089,574 A | 2/1992 | Castner | 526/142 |
| 5,448,002 A | 9/1995 | Castner | 526/140 |
| 5,834,573 A | 11/1998 | Castner | 526/142 |
| 5,854,351 A | 12/1998 | Maier | 525/197 |
| 6,310,152 B1 * | 10/2001 | Castner | |

OTHER PUBLICATIONS

J. Boor, Jr, "Ziegler–Natta Catalysts and Polymerizations," Academic Press, New York, 1979, Chapters 5–6.
D. K. Jenkins, Polymer, 26, 147 (1985).

* cited by examiner

*Primary Examiner*—Caixia Lu
(74) *Attorney, Agent, or Firm*—Alvin T. Rockhill

(57) ABSTRACT

This invention is based upon the unexpected discovery that elastomeric trans-1,4-polybutadiene can be made by utilizing a catalyst system that is comprised of an organocobalt compound, an organoaluminum compound, a para-alkyl substituted phenol, and ortho-phenyl phenol wherein the molar ratio of the para-substituted phenol to the organoaluminum compound is within the range of about 1.2:1 to about 1.8:1, and wherein the molar ratio of the ortho-phenyl phenol to the organoaluminum compound is within the range of about 0.7:1 to about 1.3:1. Accordingly, the elastomeric trans-1,4-polybutadiene made by the process of this invention does not need to be heated, such as in a hot-house, before being used in making rubber stocks.

20 Claims, No Drawings

SYNTHESIS OF ELASTOMERIC HIGH TRANS-1,4-POLYBUTADIENE

BACKGROUND OF THE INVENTION

Anionic polymerization systems can be used to produce trans-1,4-polybutadiene (TPBD) with good molecular weight control being achieved. In such anionic polymerizations there is typically an inverse relationship between the catalyst level utilized and the molecular weight attained. An anionic polymerization system for producing TPBD is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem that is frequently encountered when this three-component catalyst system is utilized in the synthesis of TPBD. Gel formation is normally encountered in cases where the catalyst system described in Japanese Patent Application No. 67187-1967 is utilized in continuous polymerizations.

U.S. Pat. No. 5,089,574 is based upon the finding that carbon disulfide will act as a gel inhibitor in conjunction with three component catalyst systems which contain an organocobalt compound, an organoaluminum compound and a para-alkyl-substituted phenol. U.S. Pat. No. 5,089,574 also indicates that conversions can be substantially improved by utilizing para-alkyl-substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

The techniques described in U.S. Pat. No. 5,089,574 are very useful in improving conversions and reducing gel formation. However, its teachings do not describe a technique for controlling the molecular weight of the TPBD being synthesized. In many applications, it would be desirable for the TPBD produced to have a lower molecular weight. There is, accordingly, a need to control the molecular weight of the TPBD produced with such Ziegler-Natta catalyst systems.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl-substituted phenol.

The presence of residual cobalt in TPBD made with cobalt-based catalyst systems is not desirable. This is because the residual cobalt can lead to polymer instability during storage. This is a particular problem in cases where the TPBD is stored in a "hot-house" prior to usage which is a standard procedure in many industries, such as the tire industry. In any case, higher levels of residual cobalt in the TPBD lead to worse problems with polymer instability. For this reason, it would be highly desirable to reduce the level of cobalt needed in catalyst systems which are used in the synthesis of TPBD. Reducing the level of cobalt needed is, of course, also desirable from a cost standpoint since cobalt compounds are relatively expensive.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased.

By utilizing the techniques disclosed in U.S. Pat. No. 5,834,573, trans-1,4-polybutadiene having a trans-isomer content within the range of about 82 percent to about 87 percent can be synthesized continuously to a high level of conversion utilizing a low level of a highly active cobalt-based catalyst system. The trans-1,4-polybutadiene made with the cobalt-based catalyst system of U.S. Pat. No. 5,834,573 also typically has a dilute solution viscosity in the range of about 1.4 to about 2.4 which is acceptable for use in tire applications and is essentially gel-free.

U.S. Pat. No. 5,834,573 more specifically discloses a process for synthesizing trans-1,4-polybutadiene in a continuous process which comprises continuously charging 1,3-butadiene monomer, cobalt (III) acetylacetonate, an organoaluminum compound, a para-alkyl-substituted phenol and an organic solvent into a reaction zone, wherein the cobalt (III) acetylacetonate is mixed with the para-alkyl-substituted phenol prior to being charged into the reaction zone; allowing the 1,3-butadiene monomer to polymerize in said reaction zone to form the trans-1,4-polybutadiene; and continuously withdrawing the trans-1,4-polybutadiene from said reaction zone. In practicing the process of this invention, it is preferred for the molar ratio of the para-substituted phenol to the cobalt (III) acetylacetonate to be within the range of about 12:1 to about 16:1 and for the molar ratio of the organoaluminum compound to the cobalt (III) acetylacetonate to be within the range of about 16:1 to about 24:1.

TPBD can be blended with various rubbers to improve performance characteristics and green strength. Since TPBD can undergo strain induced crystallization it is particularly valuable for use in tire tread rubber stocks. However, TPBD is typically a thermoplastic resin at room temperature by virtue of its high level of crystallinity. This makes it necessary to heat conventional TPBD to an elevated temperature before it can be incorporated into rubber compounds. Such a technique is the subject of U.S. Pat. No. 5,854,351 which is based upon the discovery that TPBD which contains a processing oil can be rapidly heated by radio frequency electromagnetic radiation.

U.S. Pat. No. 5,854,351 more specifically discloses a technique for mixing a trans-1,4-polybutadiene with at least one rubbery polymer which comprises: (1) heating the trans-1,4-polybutadiene to a temperature which is within the range of 105° F. (41° C.) to 200° F. (93° C.) by exposing it to electromagnetic radiation having a frequency in the range of about 2 MHz to about 80 MHz, wherein the trans-1,4-polybutadiene is oil-extended with at least 10 phr of a processing oil; and (2) mixing the trans-1,4-polybutadiene with said rubbery polymer before any portion of the trans-1,4-polybutadiene cools to a temperature below 104° F. (41° C.).

U.S. patent application Ser. No. 09/694,977, filed on Oct. 24, 2000, now U.S. Pat. No. 6,310,152, discloses a process for synthesizing elastomeric trans-1-4-polybutadiene by polymerizing 1,3-butadiene monomer in the presence of a catalyst system that is comprised of an organocobalt compound, an organoaluminum compound, a para-alkyl substituted phenol, and ortho-phenyl phenol, wherein the molar ratio of the para-alkyl substituted phenol to the organoaluminum compound is within the range of about 1.2:1 to about 1.8:1, and wherein the molar ratio of the ortho-phenyl phenol to the organoaluminum compound is within the range of about 0.7:1 to about 1.3:1.

SUMMARY OF THE INVENTION

This invention is based upon the unexpected discovery that elastomeric TPBD can be made by utilizing a catalyst system that is comprised of an organocobalt compound, an organoaluminum compound, a para-substituted phenol, and ortho-phenyl phenol wherein the molar ratio of the para-alkyl substituted phenol to the organoaluminum compound is within the range of about 1.2:1 to about 1.8:1, and wherein the molar ratio of the ortho-phenyl phenol to the organoaluminum compound is within the range of about 0.7:1 to about 1.3:1. Accordingly, the elastomeric TPBD made by the process of this invention does not need to be heated, such as in a hot-house, before being used in making rubber stocks.

This invention more specifically discloses a process for synthesizing elastomeric trans-1-4-polybutadiene by polymerizing 1,3-butadiene monomer in the presence of a catalyst system that is comprised of an organocobalt compound, an organoaluminum compound, a para-alkyl substituted phenol, and ortho-phenyl phenol, wherein the molar ratio of the para-alkyl substituted phenol to the organoaluminum compound is within the range of about 1.2:1 to about 1.8:1, wherein the molar ratio of the ortho-phenyl phenol to the organoaluminum compound is within the range of about 0.7:1 to about 1.3:1, and wherein the organaluminum compound is reacted with the ortho-phenyl phenol prior to coming in contact with the organocobalt compound.

DETAILED DESCRIPTION OF THE INVENTION

The polymerizations of the present invention will normally be carried out in a hydrocarbon solvent that can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent 1,3-butadiene monomer in the polymerization medium. Such polymerization media are, of course, comprised of the organic solvent and 1,3-butadiene monomer. In most cases, it will be preferred for the polymerization medium to contain from 10 to 25 weight percent monomer. It is generally more preferred for the polymerization medium to contain 15 to 20 weight percent 1,3-butadiene monomer.

The microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84 percent are typical. In cases where the polymerization medium contains about 30 weight percent monomer, TPBD having a trans content of only about 68 percent is generally produced.

Such polymerizations can be carried out utilizing batch, semi-continuous or continuous techniques. In a continuous process, additional 1,3-butadiene monomer, catalyst and solvent are continuously added to the reaction zone (reaction vessel). The polymerization temperature utilized will typically be within the range of about 20° C. to about 125° C. It is normally preferred for the polymerization medium to be maintained at a temperature that is within the range of about 65° C. to about 95° C. throughout the polymerization. It is typically most preferred for the polymerization temperature to be within the range of about 70° C. to about 90° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. In a continuous two-reactor system, the residence time in the first reactor will typically be from about 0.5 hours to about 1 hour with the residence time in the second reactor being about 1 hour to about 2 hours. In commercial operations, conversions in excess of about 80 percent will normally be attained. The polymerization can then be terminated using a standard procedure.

The organoaluminum compounds that can be utilized will typically be of the structural formula:

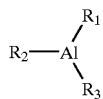

in which R1 is selected from the group consisting of alkyl groups (including cycloalkyl), aryl groups, alkaryl groups, arylalkyl groups, alkoxy groups and hydrogen; R2 and R3 being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA—H).

The organocobalt compounds utilized in the catalyst systems of this invention are typically cobalt salts or cobalt containing organic acids that contain from 1 to about 20 carbon atoms. Some representative examples of suitable organocobalt compounds include cobalt benzoate, cobalt acetate, cobalt naphthenate, cobalt octanoate, cobalt neodecanoate, bis(α-furyl dioxime) cobalt, cobalt palmitate, cobalt stearate, cobaltic acetylacetonate, cobaltous acetylacetonate, cobalt salicaldehyde, bis(cyclopentadiene) cobalt, cyclopentadienyl-cobalt nitrosyl, bis(π-allyl cobalt), bis(π-allyl cobalt trifluoroacetate), and cobalt tetracarbonyl. Cobalt naphthenate, cobalt octanoate, cobaltic acetylacetonate, and cobalt neodecanoate are highly preferred organocobalt compounds. Cobalt 2-ethylhexanoate, which is commonly referred to as cobalt octanoate, Co(Oct)$_2$, is the organocobalt compound which is most commonly used due to economic factors.

The para-alkyl-substituted phenols that can be utilized are generally of the structural formula:

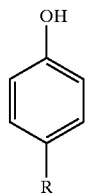

wherein R is an alkyl group which contains from about 6 to about 20 carbon atoms. Such para-alkyl-substituted phenols accordingly contain from about 12 to about 26 carbon atoms.

In most cases, the alkyl group in the para-alkyl-substituted phenol will contain from about 8 to about 18 carbon atoms. Such para-alkyl-substituted phenols contain from about 14 to about 24 carbon atoms. It is typically preferred for the alkyl group in the para-alkyl-substituted phenol to contain from about 9 to about 14 carbon atoms. Such para-alkyl-substituted phenols contain from about 15 to about 20 carbon atoms. Exceptionally good results can be attained utilizing para-alkyl-substituted phenols having alkyl groups which contain 12 carbon atoms. These highly preferred para-alkyl-substituted phenols contain 18 carbon atoms.

The polymerizations of this invention are initiated by charging the catalyst components into the polymerization medium. The amount of organocobalt compound utilized will typically be within the range of about 0.01 phm to about 1 phm (parts per hundred parts of 1,3-butadiene monomer). The amount of organocobalt compound utilized will more typically be within the range of about 0.01 phm to about 0.6 phm. It is generally preferred for the organocobalt compound to be employed at a level that is within the range of about 0.03 phm to about 0.2 phm. It is generally more preferred for the organocobalt compound to be utilized in an amount within the range of about 0.05 phm to about 0.1 phm. The organocobalt compound can be charged directly into the polymerization medium containing the 1,3-butadiene monomer.

The organoaluminum compound will be employed in an amount sufficient to attain a molar ratio of the organoaluminum compound to the organocobalt compound which is within the range of about 1:1 to about 30:1. It is typically preferred for the molar ratio of the organoaluminum compound to the organocobalt compound to be within the range of about 2:1 to about 20:1. It is more preferred for the ratio of the organoaluminum compound to the organocobalt compound to be within the range of about 8:1 to about 20:1.

It is highly preferred for the para-alkyl substituted phenol and/or the ortho-phenyl phenol to be "prereacted" with the organoaluminum compound prior to charging it into the polymerization medium. This can be accomplished by simply mixing the para-alkyl substituted phenol and the ortho-phenyl phenol with the organoaluminum compound prior to their introduction into the reaction zone. It is preferred to react the organoaluminum compound with 1 mole of the ortho-phenyl phenol prior to it coming in contact with the organocobalt compound. The organoaluminum compound will typically be prereacted with the ortho-phenyl phenol at a molar ratio of the ortho-phenyl phenol to the organoaluminum compound that is within the range of about 0.8:1 to about 1.2:1. The organoaluminum compound will preferable be prereacted with the ortho-phenyl phenol at a molar ratio of the ortho-phenyl phenyl to the organoaluminum compound that is within the range of about 0.9:1 to about 1.1:1. The organoaluminum compound will more preferable be prereacted with the ortho-phenyl phenol at a molar ratio of the ortho-phenyl phenyl to the organoaluminum compound that is within the range of about 0.95:1 to about 1.05:1.

The molar ratio of the para-alkyl substituted phenol to the organoaluminum compound will typically be within the range of about 1.2:1 to about 1.8:1. It is generally preferred for the molar ratio of the para-alkyl substituted phenol to the organoaluminum compound to be within the range of about 1.3:1 to about 1.7:1. It is generally most preferred for the ratio of the para-alkyl substituted phenol to the organoaluminum compound to be within the range of about 1.4:1 to about 1.6:1. The molar ratio of the ortho-phenyl phenol to the organoaluminum compound will typically be within the range of about 0.7:1 to about 1.3:1. The molar ratio of the ortho-phenyl phenol to the organoaluminum compound will preferably be within the range of about 0.8:1 to about 1.2:1. The molar ratio of the ortho-phenyl phenol to the organoaluminum compound will more preferably be within the range of about 0.9:1 to about 1.1:1.

Carbon disulfide can be introduced into the polymerization medium as a separate component in cases where it is employed as a gel inhibitor or it can be premixed with the monomer and solvent prior to initiating the polymerization. In such cases, the molar ratio of the carbon disulfide to the cobalt will generally be within the range of about 0.05 to about 1. In any case, the carbon disulfide can be added "in situ" to the reaction zone by charging it separately from the other components. However, in batch polymerizations it will not be necessary to add carbon disulfide to the polymerization as a gel inhibitor. In other words, the polymerizations of this invention will typically be carried out in the absence of carbon disulfide.

In the practice of this invention, it will not ordinarily be necessary to utilize a molecular weight regulator. Thus, the polymerizations of this invention will normally be conducted in the absence of molecular weight regulators. However, a dialkyl sulfoxide, a diaryl sulfoxide or a dialkaryl sulfoxide can optionally be included in the polymerization medium as a molecular weight regulator. The molecular weight of the TPBD produced naturally decreases with increasing levels of the sulfoxide molecular weight regulator present during the polymerization. In cases where a molecular weight regulator is utilized, the molar ratio of the sulfoxide molecular weight regulator to the cobalt compound will normally be within the range of about 0.05:1 to about 10:1.

The sulfoxides which can optionally be employed as molecular weight regulators can be dialkyl sulfoxides, diaryl sulfoxides or dialkaryl sulfoxides. These compounds have the general structural formula:

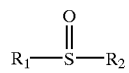

wherein R1 and R2 can be the same or different and are selected from alkyl groups, aryl groups and alkaryl groups. R1 and R2 generally contain from 1 to about 12 carbon atoms. R1 and R2 will more typically contain from 1 to about 6 carbon atoms.

Some representative examples of dialkyl sulfoxides which can be used include dimethyl sulfoxide (DMSO), diethyl sulfoxide, dipropyl sulfoxide and dibutyl sulfoxide. Diphenyl sulfoxide is an example of a diaryl sulfoxide which can be employed as the molecular weight regulator. Some representative examples of dialkaryl sulfoxides which can be utilized include di-3-phenylpropyl sulfoxide, di-phenylmethyl sulfoxide and di-para-methylphenyl sulfoxide.

In the TPBD produced by the process of this invention, at least about 65 percent of the butadiene repeat units in the polymer are of the trans-1,4-isomeric structure. The TPBD made utilizing the catalyst system of this invention typically has a trans-isomer content of at least about 70 percent. In most cases, the TPBD made by the process of this invention will have a trans-isomer content which is within the range of about 75 percent to about 85 percent. More importantly, the TPBD made by using the process of this invention is elastomeric at room temperature (about 20° C.) and has a low gel content. The TPBD made by the process of this invention typically has a crystalline melting point that is within the range of about 20° C. to about 30° C., and more typically has a crystalline melting point which is within the range of about 22° C. to about 27° C.

The polymerizations of this invention result in the formation of solutions containing the TPBD. Standard techniques can be utilized to recover the TPBD from the solution in which it is dissolved. Coagulation techniques will typically be employed to recover the TPBD from the organic solvent. Such coagulation procedures typically involve the addition of an alcohol or ketone to the TPBD solution to induce coagulation. However, the TPBD can also be recovered from the organic solvent by evaporation procedures, such as steam-stripping. Such evaporation procedures typically involve heating the polymer solution to a slightly elevated temperature in conjunction with the application of vacuum.

The TPBD made utilizing the technique of this invention is a rubbery polymer that can be used to increase the green strength of rubber stocks. It can be blended and cocured with other synthetic rubbers or natural rubber. TPBD made by the process of this invention also has the ability to strain crystallize which improves properties, such as tensile strength, tear strength and flex fatigue. It can accordingly be used in manufacturing rubber articles such as hoses, belts and tires that have improved performance characteristics. Since the TPBD made by the process of this invention is rubbery at room temperature it can be blended directly with other rubbers without the requirement of being preheated in a hot-house or by radio frequency heating.

This invention is illustrated by the following examples that are merely for the purpose of illustration and are not to be regarded as limiting the scope of the invention or the manner in which it can be practiced. Unless specifically indicated otherwise, all parts and percentages are given by weight.

EXAMPLES

In this series of experiments, TPBD was synthesized utilizing the technique of this invention. In the procedure used, a cobalt catalyst solution was made by first adding cobalt octanoate to hexanes to provide a final concentration of 0.05 M cobalt.

Aluminum catalyst solutions were made by mixing triethylaluminum with hexanes and then slowly reacting the solution with a solution containing p-dodecylphenol and o-phenyl phenol in hexanes. Various ratios were used in the make-up.

Polymerizations were carried out by charging solutions containing 14.5 percent 1,3-butadiene in hexanes into 4-ounce (118 ml) polymerization bottles followed by the addition of the aluminum catalyst solution and the cobalt catalyst solution. In this series of experiments, the molar ratio of aluminum to cobalt was held constant at 6:1 and the cobalt level was held constant at 0.24 phm. The molar ratio of the p-dodecylphenol to triethylaluminum and the molar ratio of ortho-phenyl phenol to triethylaluminum are reported in Table I.

During the polymerizations, the polymerization bottles were rotated end-over-end in a water bath which was maintained at a temperature of 65° C. After a polymerization time of about 2 hours, a shortstop solution was added to give 1.0 phm of 2-propanol and 1.0 phm of an antioxidant. The TPBD was then isolated by air drying followed by drying in a vacuum oven. Polymer yields are reported in Table I. The crystalline melting point (Tm), glass transition temperature (Tg), dilute solution viscosity, and microstructure of the TPBD samples recovered are also reported in Table I.

TABLE I

| Run | 1 | 2 | 3 | 4 | 5 | 6 |
|---|---|---|---|---|---|---|
| CO(Oct)$_2$ (phm) | 0.24 | 0.24 | 0.24 | 0.24 | 0.24 | 0.24 |
| Et3Al/Co | 6.0 | 6.0 | 6.0 | 6.0 | 6.0 | 6.0 |
| p-dodecylphenol/Al | 0 | 0.5 | 1.0 | 1.5 | 2.0 | 2.5 |
| o-phenylphenol/Al | 2.5 | 2.0 | 1.5 | 1.0 | 0.5 | 0 |
| Yield (%) | 74 | 45 | 66 | 82 | 86 | 82 |
| DSV (dl/g) | 4.85 | 3.92 | 4.64 | 4.36 | 3.20 | 2.61 |
| Tm (° C.) | −11.5 | −11.5 | +5.5 | +25.0 | +33.2 | +36.4 |
| Tg (° C.) | −75 | −75 | −75 | −76 | −77 | −75 |
| Trans-1,4 (%) | 72 | 73 | 75 | 80 | 82 | 85 |
| Cis-1,4 (%) | 3 | 3 | 3 | 2 | 2 | 1 |
| 1,2-vinyl (%) | 25 | 23 | 22 | 18 | 16 | 14 |
| Appearance | Rubber | Rubber | Rubber | Rubber | Resin | Resin |

As can be seen from Table I, the use of a molar ratio of p-dodecylphenol to triethylaluminum of 1.5:1 and a molar ratio of o-phenylphenol to triethylaluminum of 1:1 resulted in the synthesis of rubbery TPBD having a crystalline melting point of 25° C. At lower ratios of the o-phenylphenol to triethylaluminum a resinous thermoplastic polymer was produced. On the other hand, higher ratios of the o-phenylphenol to the triethylaluminum resulted in the synthesis of higher molecular weight polymer that had lower crystalline melting points. Thus, this experiment showed the critical nature of using a molar ratio of p-dodecylphenol to triethylaluminum of about 1.5:1 and a molar ratio of o-phenylphenol to triethylaluminum of about 1:1 to produce polymers that are elastomeric at room temperature, with lower dilute solution viscosities and high conversions. This ratio provided the highest trans-content while maintaining the properties of an elastomer.

While certain representative embodiments and details have been shown for the purpose of illustrating the present invention, it will be apparent to those skilled in this art that various changes and modifications can be made therein without departing from the scope of the present invention.

What is claimed is:

1. A process for synthesizing elastomeric-trans-1,4-polybutadiene by polymerizing 1,3-butadiene monomer in the presence of a catalyst system that is comprised of an organocobalt compound, an organoaluminum compound, a para-alkyl substituted phenol, and ortho-phenyl phenol, wherein the molar ratio of the para-alkyl substituted phenol to the organoaluminum compound is within the range of about 1.2:1 to about 1.8:1, wherein the molar ratio of the ortho-phenyl phenol to the organoaluminum compound is within the range of about 0.7:1 to about 1.3:1, and wherein the organaluminum compound is reacted with the ortho-phenyl phenol prior to coming in contact with the organocobalt compound.

2. A process as specified in claim 1 wherein the organoaluminum compound is of the structural formula:

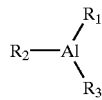

wherein R1 is selected from the group consisting of alkyl groups, cycloalkyl groups, aryl groups, alkaryl groups, arylalkyl groups, alkoxy groups and hydrogen atoms; wherein R2 and R3 can be the same or different and are selected from the group consisting of alkyl groups, cycloalkyl groups, aryl groups, alkaryl groups and arylalkyl groups; and wherein the organoaluminum compound is reacted with the ortho-phenyl phenol at a molar ratio of the ortho-phenyl phenol to the organoaluminum compound which is within the range of about 0.8:1 to about 1.2:1 prior to the organoaluminum compound coming in contact with the organocobalt compound.

3. A process as specified in claim 2 wherein the 1,3-butadiene monomer is polymerized in an organic solvent in a reaction zone at a concentration which is within the range of about 5 percent to about 30 percent, based upon the total weight of the 1,3-butadiene monomer and the organic solvent in the reaction zone; wherein the temperature in the reaction zone is within the range of about 20° C. to about 125° C.; and wherein the organoaluminum compound is reacted with the ortho-phenyl phenol at a molar ratio of the ortho-phenyl phenol to the organoaluminum compound which is within the range of about 0.9:1 to about 1.1:1 prior to the organoaluminum compound coming in contact with the organocobalt compound.

4. A process as specified in claim 3 wherein the molar ratio of the organoaluminum compound to the organocobalt compound is within the range of about 1:1 to about 40:1; and wherein the organoaluminum compound is reacted with the ortho-phenyl phenol at a molar ratio of the ortho-phenyl phenol to the organoaluminum compound which is within the range of about 0.95:1 to about 1.05:1 prior to the organoaluminum compound coming in contact with the organocobalt compound.

5. A process as specified in claim 4 wherein the organocobalt compound is present at a level which is within the range of 0.01 phm to about 0.6 phm.

6. A process as specified in claim 1 wherein the organoaluminum compound is selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum and diethyl benzyl aluminum.

7. A process as specified in claim 6 wherein the para-alkyl substituted phenol has an alkyl group which contains from about 6 to about 20 carbon atoms.

8. A process as specified in claim 7 wherein the molar ratio of the para-alkyl-substituted phenol to the organoaluminum compound is within the range of about 1.3:1 to about 1.7:1, and wherein the molar ratio of the ortho-phenyl phenol to the organoaluminum compound is within the range of about 0.8:1 to about 1.2:1.

9. A process as specified in claim 8 wherein the molar ratio of the organoaluminum compound to the organocobalt compound is within the range of about 2:1 to about 30:1.

10. A process as specified in claim 9 wherein the organocobalt compound is present at a level which is within the range of 0.03 phm to about 0.2 phm.

11. A process as specified in claim 10 wherein the para-alkyl-substituted phenol has an alkyl group which contains from about 9 to about 14 carbon atoms.

12. A process as specified in claim 11 wherein the organocobalt compound is present at a level which is within the range of 0.05 phm to about 0.1 phm.

13. A process as specified in claim 12 wherein the molar ratio of the para-alkyl-substituted phenol to the organoaluminum compound is within the range of about 1.4:1 to about 1.6:1, and wherein the molar ratio of the ortho-phenyl phenol to the organoaluminum compound is within the range of about 0.9:1 to about 1.1:1.

14. A process as specified in claim 13 wherein the molar ratio of the organoaluminum compound to the organocobalt compound is within the range of about 8:1 to about 20:1.

15. A process as specified in claim 14 wherein the para-alkyl-substituted phenol is para-dodecylphenol.

16. A process as specified in claim 15 wherein the 1,3-butadiene monomer is polymerized in an organic solvent in a reaction zone at a concentration which is within the range of about 10 percent to about 25 percent, based upon the total weight of the 1,3-butadiene monomer and the organic solvent in the reaction zone; and wherein the temperature in the reaction zone is within the range of about 65° C. to about 95° C.

17. A process as specified in claim 15 wherein the 1,3-butadiene monomer is polymerized in an organic solvent in a reaction zone is at a concentration which is within the range of about 15 percent to about 20 percent, based upon the total weight of the 1,3-butadiene monomer and the organic solvent in the reaction zone; and wherein the temperature in the reaction zone is within the range of about 70° C. to about 90° C.

18. A process as specified in claim 17 wherein the organoaluminum compound is triethylaluminum.

19. A process as specified in claim 18 wherein the organocobalt compound is cobalt octanoate.

20. A process as specified in claim 18 wherein the organocobalt compound is cobaltic acetylacetonate.

* * * * *